United States Patent Office 3,524,041
Patented Aug. 11, 1970

3,524,041
ELECTRIC ARC PROCESS AND APPARATUS
August F. Manz, Union, N.J., assignor to Union Carbide Corporation, a corporation of New York
Filed Sept. 2, 1966, Ser. No. 577,007
Int. Cl. B23k 9/00
U.S. Cl. 219—137                    8 Claims

ABSTRACT OF THE DISCLOSURE

A method for electric arc working wherein continuous ripple direct current power is supplied to an arc by rectifying and filtering alternating current such that the continuous ripple direct current is supplied at the fundamental frequency of the alternating current.

---

This invention relates to method and apparatus for electric arc working of materials with continuous ripple D.C. current and, more particularly, to such process and apparatus wherein an arc is sustained with continuous ripple D.C. current which is at the same frequency as an A.C. input current.

For purposes of this disclosure, the term "continuous ripple" is defined as a periodically recurring wave shape, each wave being contiguous to each other, and specifically excluding wave shapes which are spaced from one another.

The metalworking industry and, in particular, the welding industry are constantly seeking ways to improve existing metalworking processes and to develop new processes. For example, new welding techniques are constantly being sought—especially with the advent of new applications and alloys which, of course, create new welding problems. In this regard more and more study is being given to the power supply in the welding system. It is now realized that the power supply is critical and complex part of the welding system. Accordingly, power supplies have become more complex and expensive as they are tailored to specific welding systems.

In tailoring power supplied to consumable electrode arc welding processes, different modes of metal transfer from the electrode as well as control over weld puddle characteristics within a given mode of transfer can be achieved. It would be desirable if a power supply could be manufactured which was simple and inexpensive to construct and yet could be versatile enough to be adjusted to provide various modes of metal transfer from a consumable electrode while permitting control over the energy input to the weld puddle.

It is an object of this invention to provide a power supply which is simple and inexpensive and which can be adjusted to provide various modes of metal transfer.

It is another object of the invention to provide such a power supply which can be adjusted to control heat energy input to a weld puddle.

Another object of the invention is to provide a continuous ripple direct current power supply which can be used for electric arc welding.

Yet another object is to provide a process for electric arc working wherein a current is supplied as a stream of continuous ripple direct current to an electric arc which is used to perform an electric arc working process.

Figure 1:
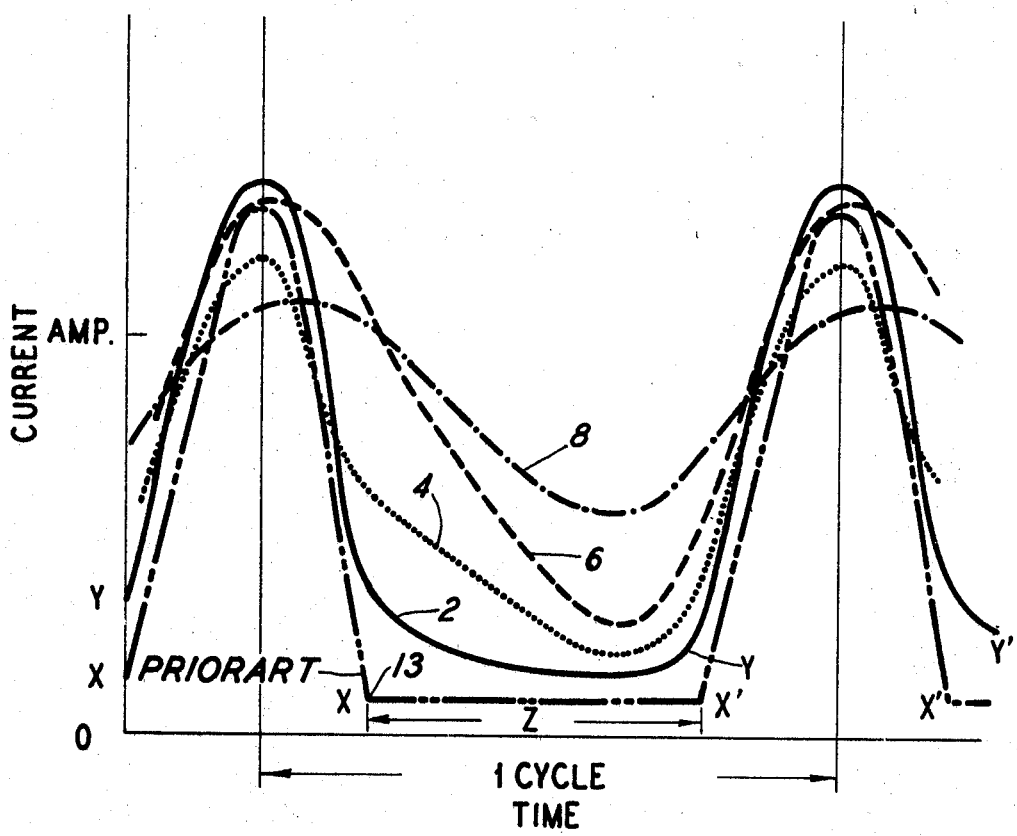
Figure 2:
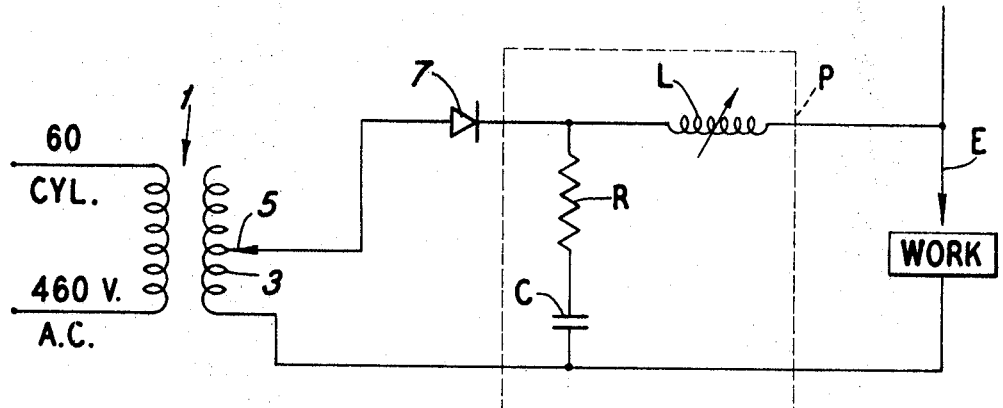

These and other objects of the invention will either be pointed out or they will be obvious from a reading of the following description and drawings wherein:

FIG. 1 shows typical wave shapes obtained with the power supply of the invention compared with the prior art; and FIG. 2 is a circuit diagram of one form of the power supply of the invention.

Up until now direct current welding power supplies have been preferably of the multiphase transformer-rectifier-type or full-wave rectified filtered single-phase-types with the frequency of the ripple being a multiple of the fundamental frequency of the basic alternating current source.

Half-wave rectified circuits have not been used for electric arc metalworking because such circuits were thought to produce undesirable ripple currents which would result in unstable arc operation. The cost of smoothing out the undesirable ripple, especially at useable welding power levels, was believed to be excessive—thus, full-wave rectification of single or polyphase power was preferred. The rectification ripple frequency of such full-wave rectification systems is $nf$; where $n$, the number of rectification anodes (phases), is 2, 3, 4, etc., and $f$ is the input line frequency. It should be noted, therefore, that in full-wave rectification systems the rectification ripple frequency is never the same as the input line frequency.

It has been discovered that a simple single-phase half-wave rectifier, where $n$ is one, with a simple filtering circuit can not only be used in electric arc working processes such as welding but that such a circuit provides unexpected versatility with smooth arc action.

In one aspect of the invention, the objects are achieved by a process for direct current arc working wherein the arc is sustained between a workpiece and an electrode which process includes the steps of supplying single-phase alternating current to an arc working circuit; rectifying and filtering the alternating current to provide continuous ripple direct current at the fundamental frequency of the alternating current; supplying the continuous ripple direct current to the arc to sustain such arc and then directing such arc against a workpiece to be arc worked.

The single-phase alternating current can also be supplied by an A.C. generator driven by a motor or engine. The rectifier action can be provided by commutation of the generated alternating current.

In another aspect of the invention the objects are achieved by a power supply for delivering power to an electric arc to be used in arc working of metals which comprises a circuit having a transformer connected to an alternating current source of power; half-wave rectifier means connected in series with the secondary of the transformer; a parallel circuit connected on the direct current side of the rectifier means, one leg of the parallel circuit having a resistance and a capacitance and the other leg having a variable inductance and means for connecting an electrode and a workpiece in series with the variable inductance.

Referring to FIG. 1, a preferred embodiment of the invention consists of a transformer 1 connected to a single-phase alternating current power source typically 460 volts, 60 Hz. (c.p.s.). The secondary 3 of the transformer 1 has means 5 for selecting the open circuit voltage which preferably is from 20–60 volts at the peak. Connected in series with secondary 3 is a rectifier means 7. The rectifier means may be a ½ wave rectifier or its equivalent, for example, a silicon-controlled rectifier could be used. However, at present a silicon diode is preferred. Connected in series with rectifier means 7 is a parallel circuit P having in one leg a variable inductance L, an electrode E and a workpiece W. In the other leg is connected a variable resistance and a capacitance. The inductance L should be variable from 0 to about 1000 microhenries, the preferred range being about 100 to 600 microhenries. The electrode may be consumable or nonconsumable, for purposes of the description, reference will be made to a consumable electrode. The variable resistance R controls the rate of charging and discharging of the capacitance C. In the present embodiment the value of R is in the range of from about 0 to about 0.2 ohm. Any value of C may be used consistent with the objectives desired. Typically, capacitance C may have a value of from about 20,000 microfarads up to about 200,000 microfarads.

It has been unexpectedly discovered that the power supply of the invention, while simple and inexpensive, will provide stable electric arc conditions for welding and also that such power supply is extremely versatile. Preferably, the power supply of the invention can be adjusted by controlling open circuit voltage, inductance L and/or the resistance R to provide welding power suitable for use with a consumable electrode to produce various modes of metal transfer. It is also possible to adjust the capacitance—if desired.

For example given specific conditions, adjustments can be made to achieve high current spray transfer which is characterized by a stream of small molten drops forcefully projected axially from the end of the consumable electrode to the work.

By readjusting the voltage, inductance and the resistance, short-circuiting metal transfer can also be achieved. Short-circuiting metal is characterized by metal transfer from the consumable electrode to the weld puddle during periods when the electrode is short-circuited to the work.

Further, the power supply of the invention can also be adjusted to achieve spray-type transfer at low average currents. Low average current spray transfer has been achieved in the prior art by superimposing upon an arc keep-alive current discrete pulses of welding current. In FIG. 1 the curve noted as "prior art" shows a typical wave shape obtained by prior art discrete pulse method. It will be noted that such wave shape or pulse extends from X to X and X' to X' with a time interval Z between pulses. In marked contrast, the continuous ripple power supply of the invention is a simple single unit which produces waves the shapes of which can be varied such as in curves 2–8, and which are contiguous to each other, as contrasted with spaced from each other. For example, a wave shape in curve 2 is from Y to Y with no time interval between wave shapes. By adjusting inductance L and/or resistance R wave shapes such as 4, 6 and 8 can be obtained. By controlling wave shape, control over rate of change of current is achieved and thus can be utilized to control heat input to the work. This discovery is especially significant since it provides a way of achieving welding processes wherein the fluidity of the weld puddle can be controlled by controlling the wave shape of the current to the weld puddle; this has not been done heretofore.

Further, since the rate of decay in the wave shapes of curves 2–8 is free from the discontinuity in rate of change of current which is found in the prior art at point 13, the arc action obtained with the power supply of the invention is smoother, resulting in better puddle control. The smooth arc action of the present invention results in other benefits. For example, improved shielding is achieved because of the smooth arc.

In operation, the open circuit voltage of the power supply is selected by varying adjusting means 5. Adjustment is then made to the variable inductor L to select a condition which has been determined empirically and which is to the best liking of the particular welding operator. It is to be understood that the resistance R could also be made variable if desirable and adjustments could be made to both resistance and inductance. An arc is struck between the electrode and work and the arc working process started. Adjustments can be made during the performance of the process to tune the power supply to the arc as suits the particular operator. For example, if the operator desires a more fluid puddle, the resistance may be reduced or the inductance value increased to produce a continuous ripple, such as curve 8, which results in a "hotter" process. Conversely, if the operator desires a "colder" or less fluid puddle, the resistance is increased or inductance decreased to provide a continuous ripple curve, such as curve 2. Thus, it will be obvious that by varying the wave shape of the continuous ripple control over weld puddle fluidity is readily achieved.

It has been found in welding with a consumable electrode and the power supply of the invention, that in some cases it is desirable, in order to start the arc, to use more current than is required for welding. This is referred to as "hot start" in the art. It is possible to achieve hot start with the power supply of the invention by short-circuiting the resistor of the resistor-condenser portion of the circuit. When the resistor is short-circuited, the rate of charge and discharge of the condenser is increased. This permits the condenser on demand to supply a larger current which is beneficial for starting.

It is also possible to weld with the resistor permanently short-circuited. In such case varying the inductor between a minimum and maximum value produces a variable amplitude ripple for spray arc welding.

Having described the invention, the following example is provided to illustrate a typical useable condition for practicing the present invention.

The power supply circuit was as shown in FIG. 2. The transformer was a single-phase, 460 volt transformer with means for selecting the open circuit voltage from the secondary thereof. The source frequency was 60 Hz. An electric arc torch, of the type used for metal inert gas welding wherein a consumable electrode is fed through a torch and picks up current from a contact tip, was connected in circuit with the power supply and a ⅛ in. thick aluminum plate. Argon shielding gas was passed through the torch at 50 c.f.h. The electrode was connected to the positive side of the power supply. The work was connected to the negative side of the power supply. The contact tip-to-work distance was between ⅝ and ¾ in. The wire was 1/16 in. diameter aluminum. The wire feed speed was set at 105 i.p.m. and this was correlated with the continuous ripple current of an average current of about 100 amperes. By adjusting the open circuit voltage obtained from the transformer, an average arc voltage of about 18½ volts was produced to provide an arc length of between ⅛ and 3/16 in. The resistor R was set at 0.1 ohm. The capacitor C was 0.1 farad. The inductor L was about 700 microhenries. The weld produced was satisfactory in all respects.

It has been found that the power supply of this invention is useful when the average of the continuous ripple direct current supplied to the arc is correlated with the consumable electrode feed speed such that for each ripple a length of consumable electrode is consumed equivalent in volume to a drop of molten metal whose diameter lies in the range of ⅔ to 1⅓ of the wire diameter. In this example the diameter of the molten drop was approximately 0.055, which is equal to approximately 0.9 times the diameter of the wire.

The correlation between the electrode feed speed and the average of the continuous ripple direct current supplied to the arc can be achieved in several ways. For example, the open circuit voltage of the transformer can be varied to control the alternating current supplied to the circuit. The inductance and/or resistance values can be varied to controllably filter the continuous ripple direct current provided to the filtering circuit. Another alternative is to control both the open circuit voltage and the inductance value to achieve the desired correlation.

In another example of the invention a tungsten electrode inert gas-shielded welding torch was connected in circuit with ⅛ in. thick stainless steel workpiece and a power supply essentially as shown in FIG. 2. However, in this case it was found that it was desirable to add a resistor of approximately 0.08 ohm in circuit with the inductance L. The purpose of the resistor was to limit the short-circuit current supplied to the tungsten electrode when scratch-starting such electrode on the work. The electrode was 3/32 in. diameter thoriated tungsten and was connected to the negative side of the power supply. The shielding gas was argon. A manual weld was made at an average continuous ripple direct current of about 110 amperes at about 11 volts. The resistor, capacitor, and indicator were set at the same values given in the previous example.

Having described the invention with reference to certain preferred embodiments, it will be understood that modifications in the arrangement of elements may occur to those skilled in the art without departing from the true spirit and scope of this invention.

What is claimed is:

1. A process for direct current consumable electrode electric arc welding wherein the arc is established between a consumable electrode and a workpiece to be welded, comprising: supplying single-phase alternating current to an arc welding circuit; rectifying and filtering such alternating current to provide a continuous ripple direct current at the fundamental frequency of the alternating current to said arc; correlating the average of such continuous ripple direct current supplied to said arc with the consumable electrode feed speed such that for each ripple a length of consumable electrode is consumed equivalent in volume to a drop having a diameter lying in the range of ⅔ to 1⅓ of the wire diameter; and directing such arc against the work to be welded.

2. Process according to claim 1 wherein the supply of single-phase alternating current is controlled to controllably correlate the average of said continuous ripple direct current with said electrode feed speed.

3. A process for direct current consumable electrode electric arc welding wherein the arc is established between a consumable electrode and a workpiece to be welded, comprising: supplying single-phase alternating current to an arc welding circuit; rectifying such alternating current to provide half-wave rectification thereof; controllably filtering such alternating current to provide an average continuous ripple direct current at the fundamental frequency of the alternating current; correlating the consumable electrode feed speed with the average of said continuous ripple direct current such that for each ripple a length of consumable electrode is consumed equivalent in volume to a drop having a diameter lying in the range of ⅔ to 1⅓ of the wire diameter; and directing such arc against the workpiece to be welded.

4. Process for direct current consumable electrode electric arc welding wherein the arc is sustained between the consumable electrode and a workpiece to be welded comprising controllably supplying single-phase alternating current to an arc welding circuit; rectifying such controllably supplied alternating current to provide half-wave rectification thereof, controllably filtering such rectified alternating current to provide continuous ripple direct current at the fundamental frequency of the alternating current and to controllably select the average of said continuous ripple direct current; and correlating the consumable electrode feed speed with the so-selected average of said continuous ripple direct current such that for each ripple a length of consumable electrode is consumed equivalent in volume to a drop having a diameter lying in the range of from about ⅔ to about 1⅓ of the wire diameter; and directing such arc against the work to be welded.

5. In a process of direct current arc working with an arc established between an electrode and a workpiece wherein electric energy for said arc is provided from a power supply including a single-phase alternating current source, a half-wave rectifying means connected in series circuit with such alternating current source, a parallel circuit connected in series with the direct current side of said half-wave rectifying means and such alternating current source, one leg of said parallel circuit containing a resistor and a capacitor and the other leg containing a variable inductor, said electrode and said workpiece; the improvement comprising the steps of rectifying said alternating current; adjustably filtering said rectified alternating current to provide continuous ripple direct current at the fundamental frequency of the alternating current; supplying such continuous ripple direct current to said arc to sustain such arc; directing such arc against said workpiece to arc work such workpiece.

6. Process according to claim 5 wherein the rate of decay of the wave shapes in the continuous ripple direct current is free from discontinuity.

7. A process according to claim 6 wherein the electrode in the electric welding process is nonconsumable.

8. A process for direct current consumable electrode electric arc welding wherein the arc is established between a consumable electrode and a workpiece to be welded, comprising: supplying single-phase alternating current to an arc welding circuit; rectifying and filtering such alternating current to provide a continuous ripple direct current at the fundamental frequency of the alternating current to said arc; correlating the average of such continuous ripple direct current supplied to said arc with the consumable electrode feed speed such that for each transfer of metal a length of consumable electrode is consumed equivalent in volume to a drop having a diameter lying in the range of ⅔ to 1⅓ of the wire diameter; and directing such arc against the work to be welded.

References Cited

UNITED STATES PATENTS

| 3,025,388 | 3/1962 | Turbitt | 219—131 |
| 3,210,670 | 10/1965 | Jones | 321—47 X |
| 3,238,349 | 3/1966 | Anderson et al. | 219—131 X |
| 3,349,313 | 10/1967 | Wilmarth | 321—46 X |

FOREIGN PATENTS 636,967 2/1962 Canada.

JOSEPH V. TRUHE, Primary Examiner

C. L. ALBRITTON, Assistant Examiner

U.S. Cl. X.R.

219—131